United States Patent [19]

Honjo et al.

[11] Patent Number: 4,622,594
[45] Date of Patent: Nov. 11, 1986

[54] IMAGE RECORDING APPARATUS

[75] Inventors: Takeshi Honjo, Kawasaki; Makoto Kitahara; Yasumichi Suzuki, both of Tokyo; Naomi Takahata, Yokohama, all of Japan

[73] Assignee: Canon Kabushiki Kaisha, Tokyo, Japan

[21] Appl. No.: 664,783

[22] Filed: Oct. 25, 1984

[30] Foreign Application Priority Data

Oct. 26, 1983 [JP] Japan ................................ 58-200368

[51] Int. Cl.$^4$ .............................................. H04N 1/10
[52] U.S. Cl. .................................... 358/293; 358/280; 355/14 SH
[58] Field of Search ............... 358/256, 280, 293, 285; 355/14 SH, 14 CH

[56] References Cited

U.S. PATENT DOCUMENTS

| | | | |
|---|---|---|---|
| 4,409,624 | 10/1983 | Kingsley | 358/285 |
| 4,422,100 | 12/1983 | DuVall et al. | 358/294 |
| 4,536,077 | 8/1985 | Stoffel | 355/14 SH |
| 4,561,765 | 12/1985 | Masuda | 355/14 SH |

Primary Examiner—James J. Groody
Assistant Examiner—Edward L. Coles
Attorney, Agent, or Firm—Fitzpatrick, Cella, Harper & Scinto

[57] ABSTRACT

An image recording apparatus has a reader capable of dynamic and static reading, a printer, an original feed unit, and a control circuit including a microcomputer. The apparatus can continuously produce copies in a multicopy mode.

7 Claims, 19 Drawing Figures

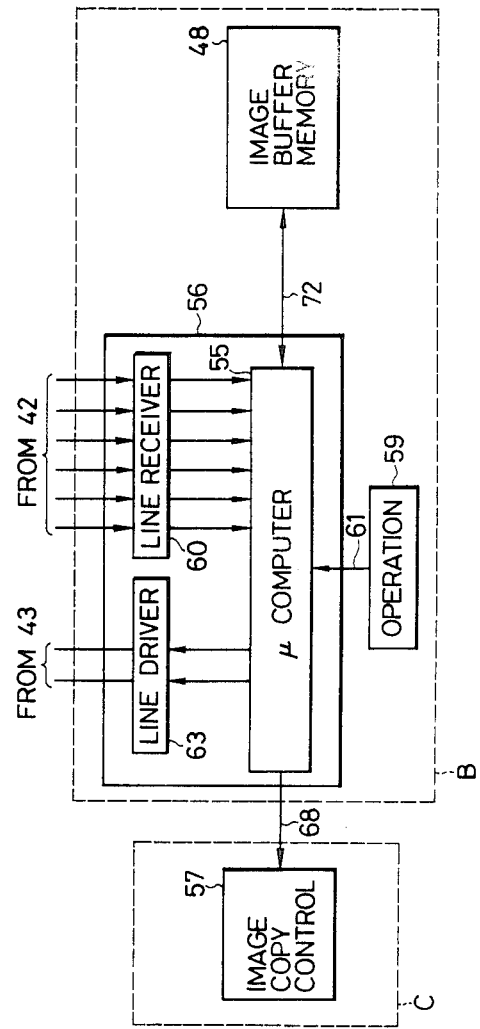

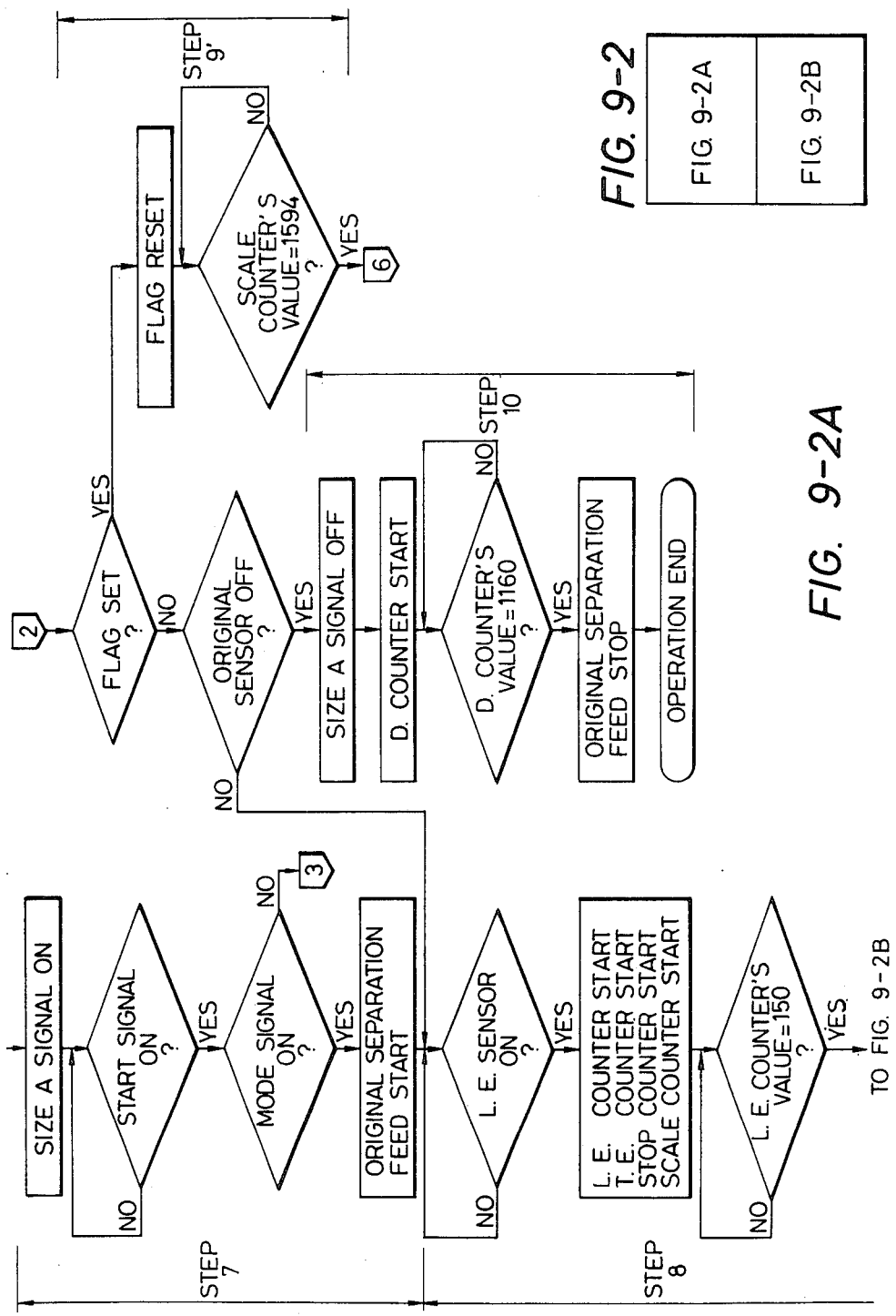

IMAGE RECORDING APPARATUS

BACKGROUND OF THE INVENTION (a) Field of the Invention

The present invention relates to an image recording apparatus having a read mode (to be referred to as dynamic reading hereinafter) while an original is being moved, and a read mode (to be referred to as a static reading hereinafter) when an original is set at a predetermined position while an optical system for reading the original is being moved.

(b) Description of the Prior Art

In a conventional original reading/recording apparatus used in a facsimile system or the like, only dynamic reading is performed in such a manner that an original image is read by a CCD and is converted to a digital signal, and the digital signal is compressed and is sequentially stored in an image buffer memory. At the reception side, the compressed data is decoded, and decoded data is printed out at a printer.

When this apparatus is used in a local mode, i.e., when the apparatus is used as a normal copying machine without using a communicating image buffer memory in the copy mode, only one copy is obtained even if two or more copies are required. When two or more copies are required, the original is set and is repeatedly read the number of times corresponding to the number of copies required, resulting in cumbersome operation.

SUMMARY OF THE INVENTION

The present invention has been made in consideration of the above situation, and has as its object to provide an improved image recording apparatus.

It is another object of the present invention to provide an image recording apparatus with improved operability.

It is still another object of the present invention to provide an image recording apparatus capable of preventing a decrease in recording speed and of performing effective image recording.

The above and other objects, features and advantages will be apparent from the following detailed description in conjunction with the accompanying drawings.

BRIEF DESCRIPTION OF THE DRAWINGS

FIGS. 9-1, 9-2, A and B, 10-1, 10-2, and 13 are respectively flow charts of an original feed unit.

DETAILED DESCRIPTION OF THE PREFERRED EMBODIMENT

Figure 1:
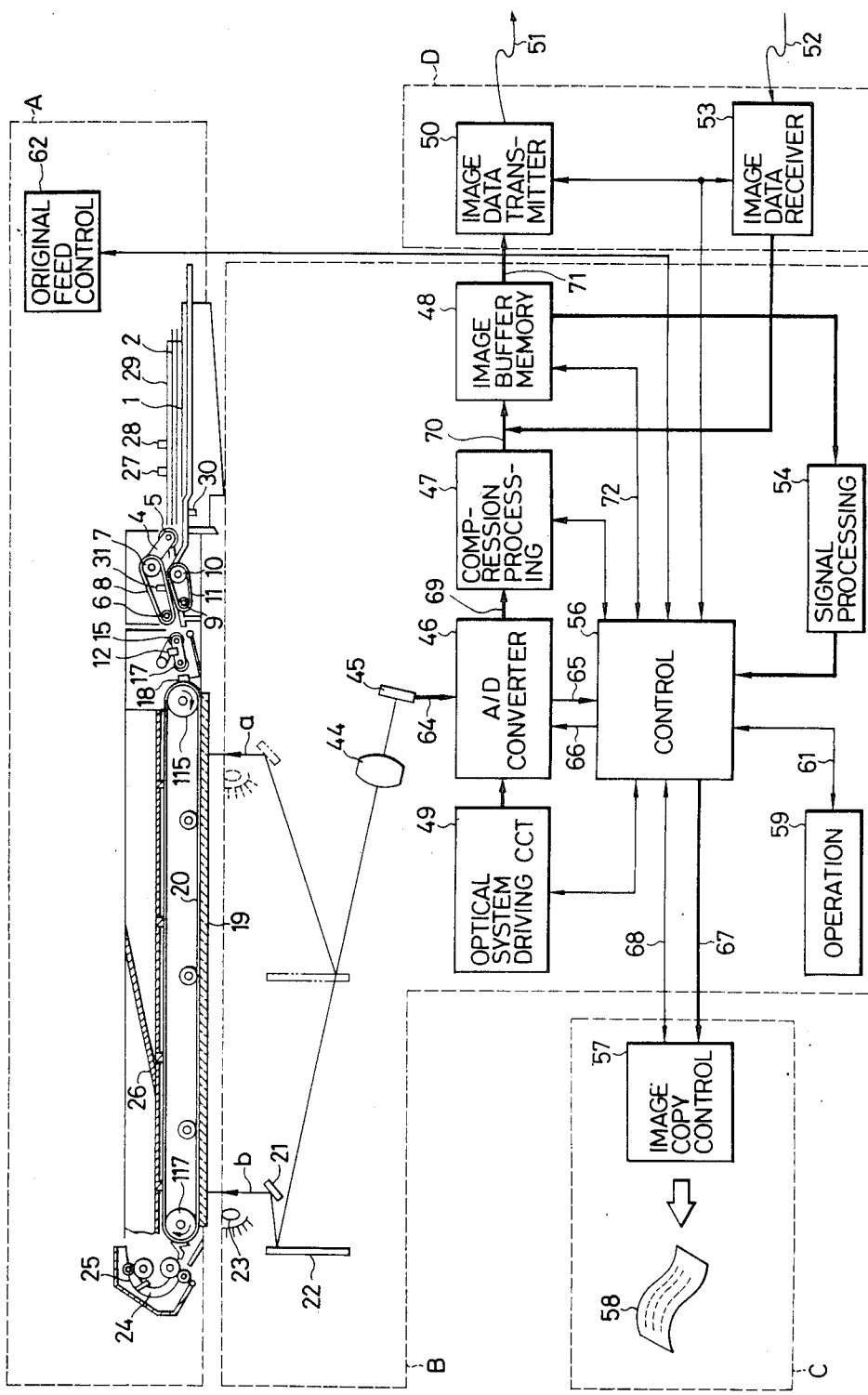
FIG. 1 is a block diagram showing the overall configuration of an image recording apparatus according to an embodiment of the present invention.
Figure 2A:
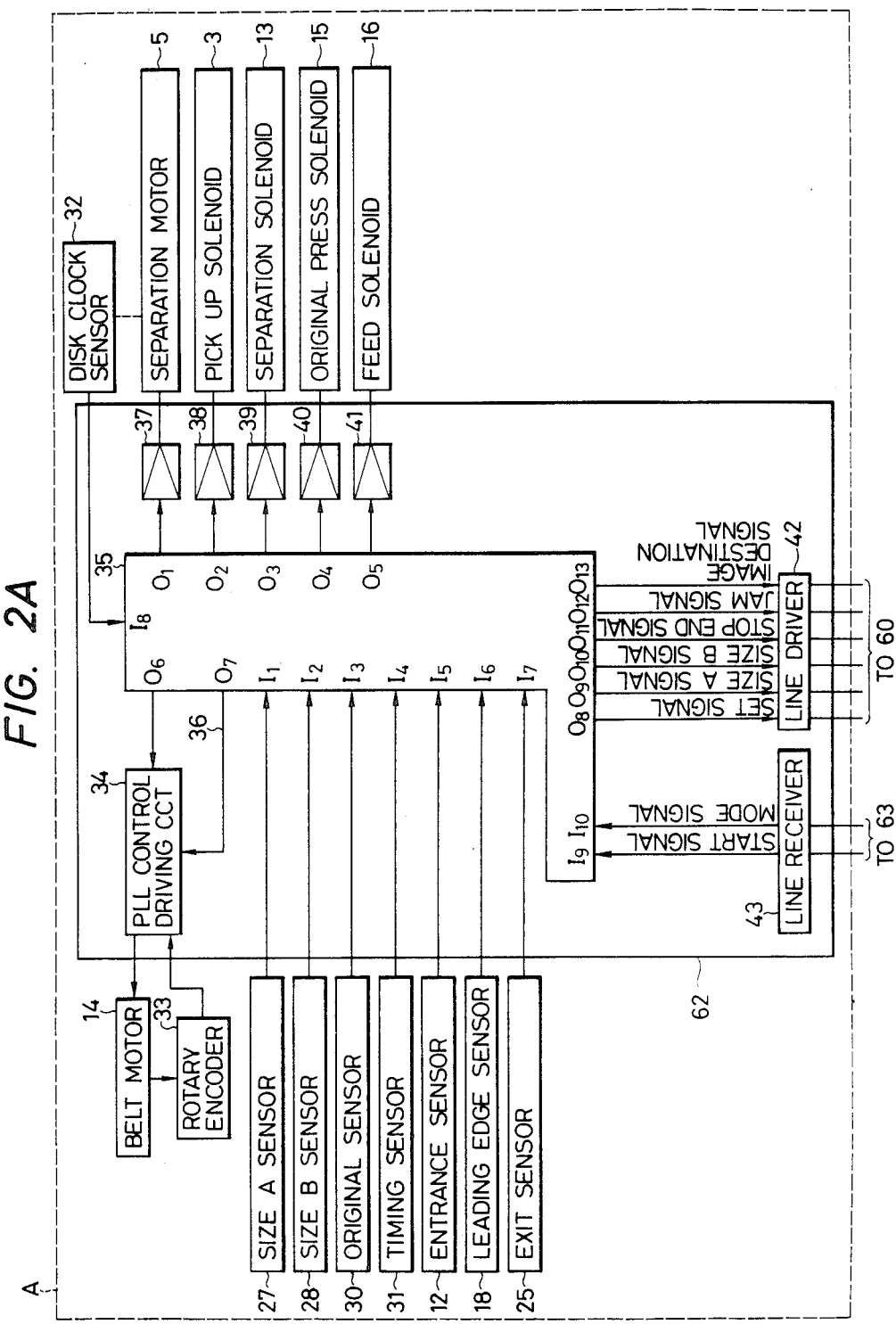
FIGS. 2A and B are block diagrams showing the detailed arrangement of the control section in FIG. 1.

The present invention will be described in detail with reference to the accompanying drawings. FIG. 1 is a block diagram showing the overall configuration of an image recording apparatus shown in FIG. 1, and FIG. 2 is a block diagram showing the relationship between an original feed unit, the reader and the printer. The image reading apparatus according to this embodiment will be described in detail with reference to FIGS. 1 and 2. An original feed unit A is controlled by an original feed control circuit 62. The image reading apparatus also comprises a reader B, a printer C and a transmitter/receiver interface for controlling transmission/reception of image data. A plurality of originals 2 are placed facing down on an original stack hopper 1 in the original feed unit A. An uppermost original among the plurality of originals 2 is fed by an interlocking operation of a pick-up roller supported by an arm 4 vertically moved upon an ON/OFF operation of a pick-up solenoid 3, an upper belt 8 looped between a driving roller 6 rotated counterclockwise by a separation motor 5 and a driven roller 7, and a lower belt 11 which is looped between a roller driven counterclockwise by the separation motor 5 and the driven roller 10. The uppermost original is fed to an entrance sensor 12. Thereafter, the original passes by a leading edge sensor 18 by means of an original press roller 15 rotated upon vertical movement by operation of an original press solenoid 76, and a feed roller 17 rotated upon ON operations of a belt motor 14 and a feed solenoid 16. The original is fed between platen glass 19 and an endless conveyor belt 20 which is brought into a vicinity of or in contact with the entire area of the upper surface of the platen glass 19. The original is fed by a frictional force with the endless conveyor belt 20 and is subjected to constant speed dynamic reading at a position a or is temporarily stopped at a position b for static reading in such a manner that a first mirror 21, a second mirror 22 and an illumination lamp 23 of the reader B are scanned by an optical system driving circuit 49. The original then passes along a discharge path 24 and passes by an exit sensor 25. The original is discharged on a discharge tray 26 in such a manner that an image surface of the original faces upward. Size A and B sensors 27 and 28 detect the corresponding sizes of originals placed on the original stack hopper 1, respectively. The sensor 27 or 28 detects a width of the original by a position of a movable original guide plate 29 along a direction perpendicular to the original feed direction. An original sensor 30 detects whether or not the originals are placed on the hopper. A timing sensor 31 detects a trailing edge of the original being fed and generates a timing signal which represents a timing of the next original feeding. The original is stopped at the position b in such a manner that the belt motor 14 is instantaneously stopped when a predetermined number of clock pulses generated from a disk clock sensor 32 in response to movement of the conveyor belt 20 looped between rollers 115 and 117 is counted after the leading edge of the original is detected by a leading edge sensor 18. The speed of constant driving of the belt motor 14 is determined by a time-divided data transferred from an output port 07 of a microcomputer 35 through a signal line 36 and a PPL control driving circuit 34 operated in response to a pulse from a rotary encoder 33 mounted on a rotor shaft of the motor 14. The original feed unit A also comprises drivers 37 to 41, a line driver 42 for supplying various signals (to be described later) from output ports 08 to 013 of the microcomputer 35 to the reader B, and a line receiver for receiving the various signals (to be described later) from the reader B. In the reader B, when dynamic reading at the position a or static reading at the position b is performed, light reflected by the original is focused by a focusing lens 44 and is incident as a slit light ray having a one-line length of the original width on a CCD 45. An optical signal is converted by an A/D converter 46 to a digital signal. The digital signal is compressed by a compression processing circuit 47, and compressed data is stored as image data in an image buffer memory 48. The image data is sent from an image data transmitter 50 in the transmitter/receiver interface onto a transmission line 51 when the image recording apparatus is set in a facsimile transmission mode. However, in the facsimile reception mode, image data from a reception line 52 is stored in the image buffer memory 48 through an image data receiver 53. Thereafter, the compressed image data is elongated by a signal processing circuit 54 to raw data. The raw data is supplied to the printer C through a control unit 56 which has a microcomputer 55 as the major component and which controls the overall operation of the system. The printer C is controlled by an image copy control circuit 57, and a copy sheet 58 having the original image is outputted. An operation unit 59 is used to operate the system as a whole. The operation unit 59 has a selection switch for setting the system in a facsimile transmission mode (to be described later) or a facsimile reception mode, a copy start key for starting a copy mode (to be described later) so as to use the system as an offline copy machine, copy number preset numeric keys, a stop key, and various indicators such as a JAM indicator and a paper empty indicator.

The copy mode of the image recording apparatus will be described. When an original is placed on the hopper 1, the original sensor 30 detects the original, and an input signal is supplied to an input port I3 of the microcomputer 35. Size detection signals are supplied from the size A and B sensors 27 and 28 to input ports I1 and I2, respectively. A size A signal (the A4 size in this embodiment) from the output port 09 of the microcomputer 35 or a size B signal (the B4 size in this embodiment) from the output port 010 is supplied to the microcomputer 55 through the line driver 42 and the line receiver 60. A copy sheet having the designated paper size is selected through a control line 68. An operator sets a copy number at the operation unit 59 before or after the original is placed on the hopper. In this case, assume that a copy number is one. When the start key is depressed, a signal representing a single copy and a key depression signal are supplied from the operation unit 59 to the microcomputer 55 through the signal line 61. A start signal for operating the original feed unit A and a command signal as a MODE signal of high level are supplied to the microcomputer 35 through the line driver 63 and the line receiver 43. The original feed unit A is started for dynamic reading. In the reader B, the optical system is moved and stopped at the position a simultaneously when the start key is depressed, thereby setting the apparatus in a read standby mode. An image signal is enabled when the leading edge of the original passes by the position a and is disabled when the trailing edge of the original passes by the position b. This output signal is supplied from the output port 013 to the reader B. Thereafter, in the reader B, the image data read by the CCD 45 passes through a data line 64 and is A/D converted by the A/D converter 46. The resultant digital signal is supplied through an information line 65 and is sampled in synchronism with the original feed speed in response to a sampling signal 66. The sampled signal is fed to the image copy control circuit 57 in the printer C through a data line 67, thereby performing copy operation in synchronism with original feeding in response to a control signal 68. As a result, the copy sheets 58 are sequentially outputted. Similarly, when the copy sheet number is set to 2 or more, the MODE signal of low level is supplied as a static reading instruction signal to the microcomputer 35 through the line driver 63 and the line receiver 43. The original feed unit A performs operations for static reading. The original is stopped at the stop position b, and a stop end signal is supplied to the reader B. The reader B scans the original by the optical system driving circuit 49 and continues scanning until the original image is read by the CCD 45 and is copied by the preset copy number. The copied sheets 58 are then outputted. When multicopy operation is completed, the current original is discharged and at the same time the next original is fed to the position b. The copy operation is repeated until the originals become emptied from the tray or hopper 1.

Single dynamic reading will be described wherein a length of the original along the original feed direction exceeds a standard size, i.e., a long size sheet is used. In this case, the long size original is detected by the leading edge sensor 18. The leading edge signal is disabled at a time when the standard length portion of the long size original passes by the original read position a. Thereafter, a nonscanned portion of the original during dynamic reading is stopped at the original stop position b, and the stop end signal is supplied to the reader B. The reader B performs static reading, and the read data is printed on another copy sheet. In this case, the start signal is disabled when the reader receives the stop end signal. The start signal is supplied again to the original feed unit A when static reading is completed while the image data is printed on another sheet. The original is stopped with respect to the position b in such a manner that a printout image at the position a in the dynamic reading mode partially overlaps a printout image at the position b in the static reading mode. Static reading is sequentially performed in accordance with the lengths of the originals which are detected by the leading edge sensor 18, and the images are printed on other sheets.

The facsimile transmission mode will be described hereinafter. The transmission mode is set at the operation unit 59, and the start button is depressed. The same signal as in the dynamic reading copy mode is supplied from the reader B to the original feed unit A, so that dynamic reading is started. The original is read by the CCD 45, and the read image is converted by the A/D converter 46 to a digital signal. The digital signal is compressed by the compression processing circuit 47. The compressed signal is stored in the image buffer memory 48 through a data line 70. At the same time, the image data transmitter 50 in the transmitter/receiver interface D checks the transmission enble state of the transmission line 50. When the transmission line 50 is set in the transmission enable state, the data is transmitted through a data line 71. In this transmission operation, when the image buffer memory 48 overflows, an overflow signal is supplied to the control unit 56 through the signal line 72. The MODE signal is disabled (goes low) so as to cause the original feed unit A to perform static reading. The original feed unit A causes the leading edge of the original to stop at the original stop position b and supplies a stop end signal to the reader B. The data representing partial image of the original and stored in the image buffer memory 48 is delected through a signal line 72. The data is also transmitted through the line 51. When the image buffer memory 48 becomes empty to some extent, static reading is started.

The image data from the static reading is stored in the image buffer memory 48. In this case, the original feed unit A performs static reading for the original upon occurrence of overflow and the next original. The following original is then subjected to dynamic reading. This is because the next original passes through the dynamic reading position a when the original at the time of overflow is stopped at the original stop position b.

When a long size original is used in the transmission mode, the same operation as in the long size original in the copy mode is performed.

When an amount of image data transmitted in the reception mode exceeds a predetermined amount, the image data can be printed out on a plurality of copy sheets.

Figure 3:
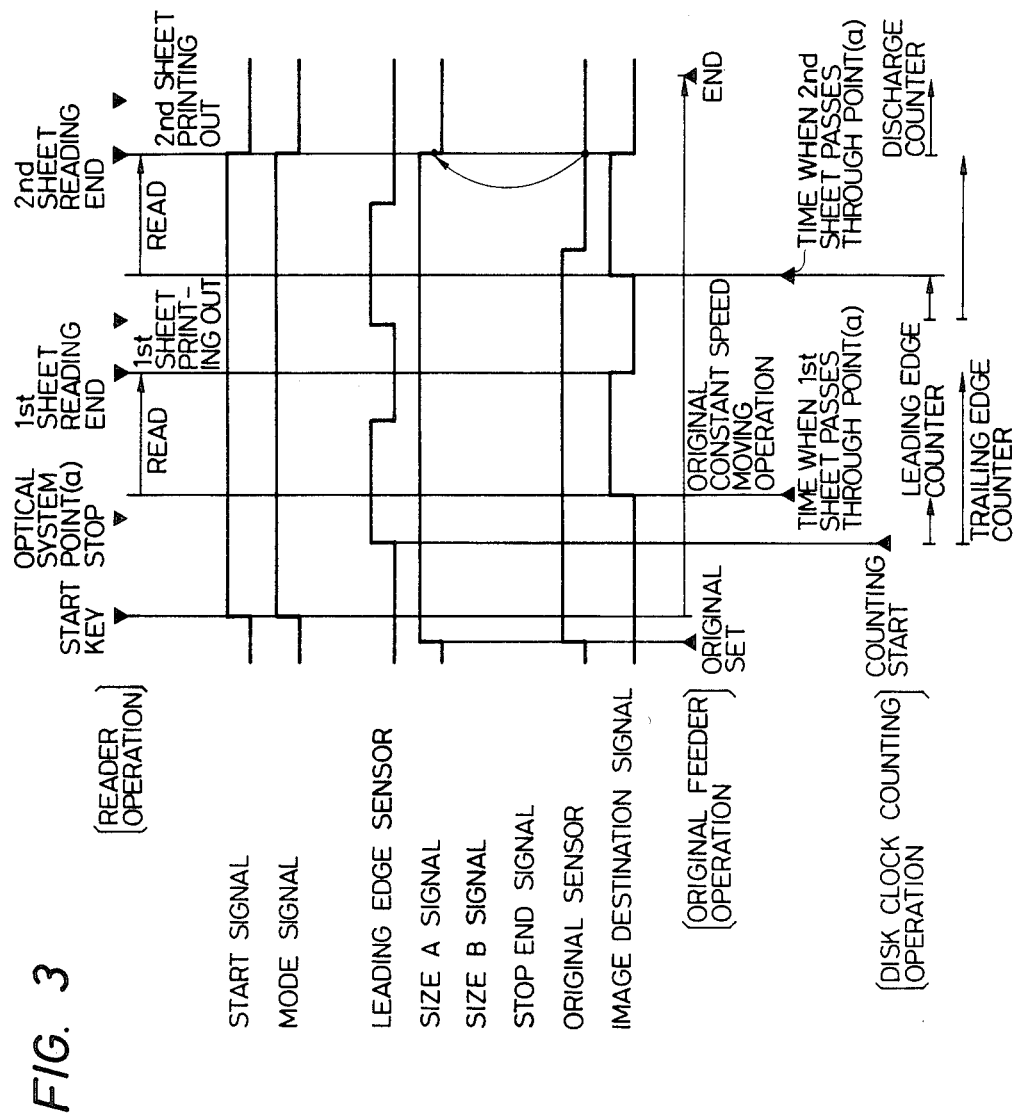
FIGS. 3 to 7 are respectively timing charts for explaining the operations in the respective modes.
Figure 4:
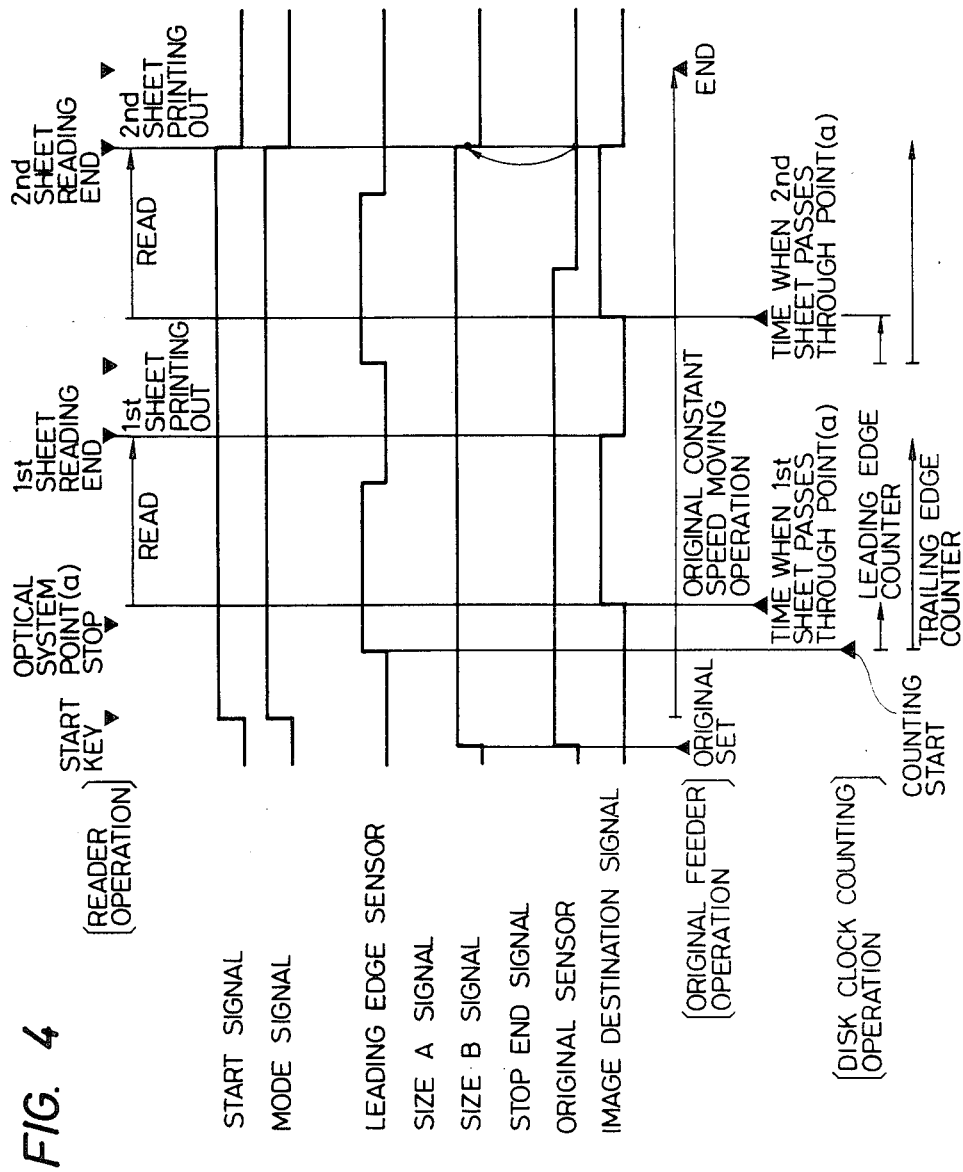
Figure 5:
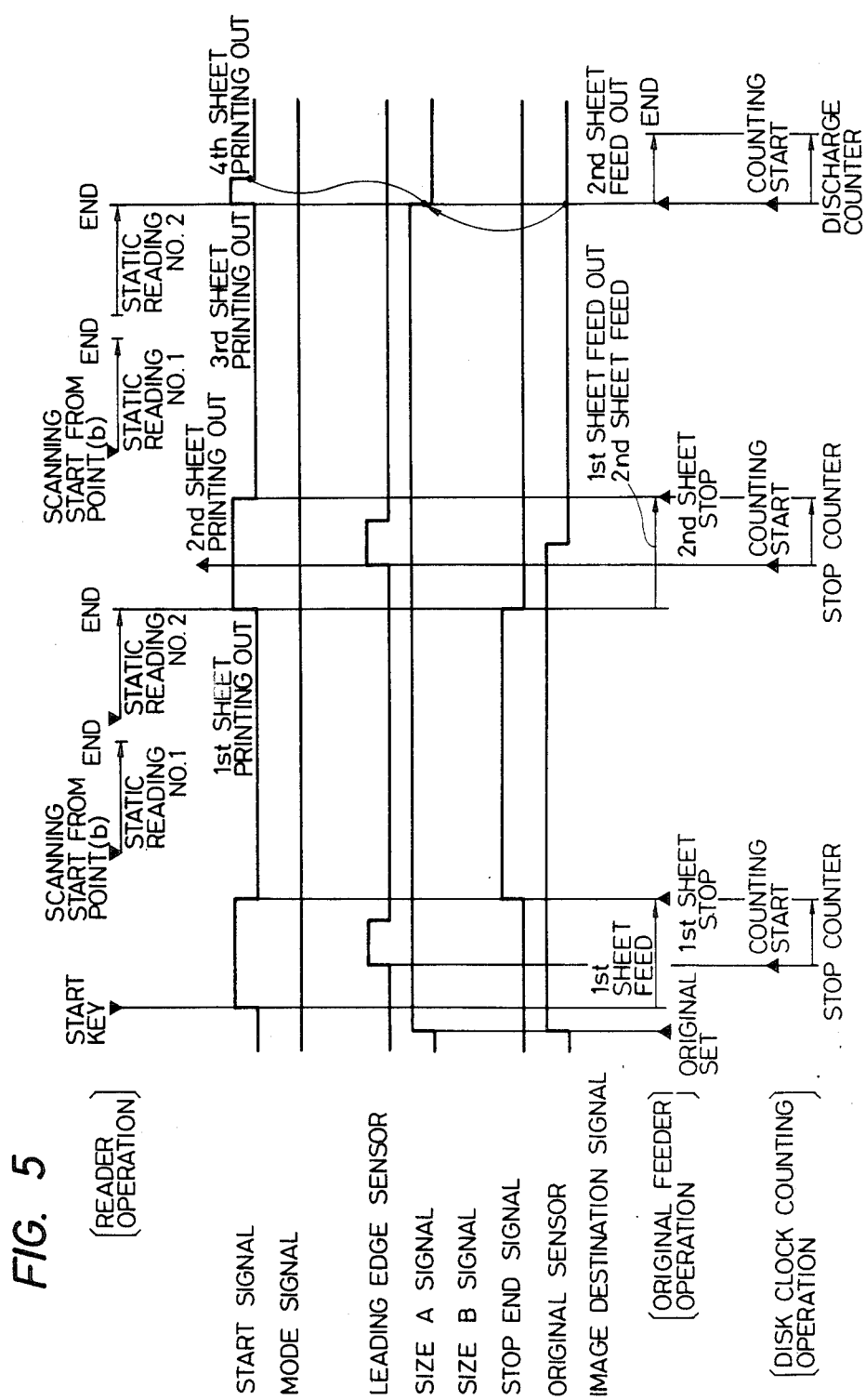
Figure 6:
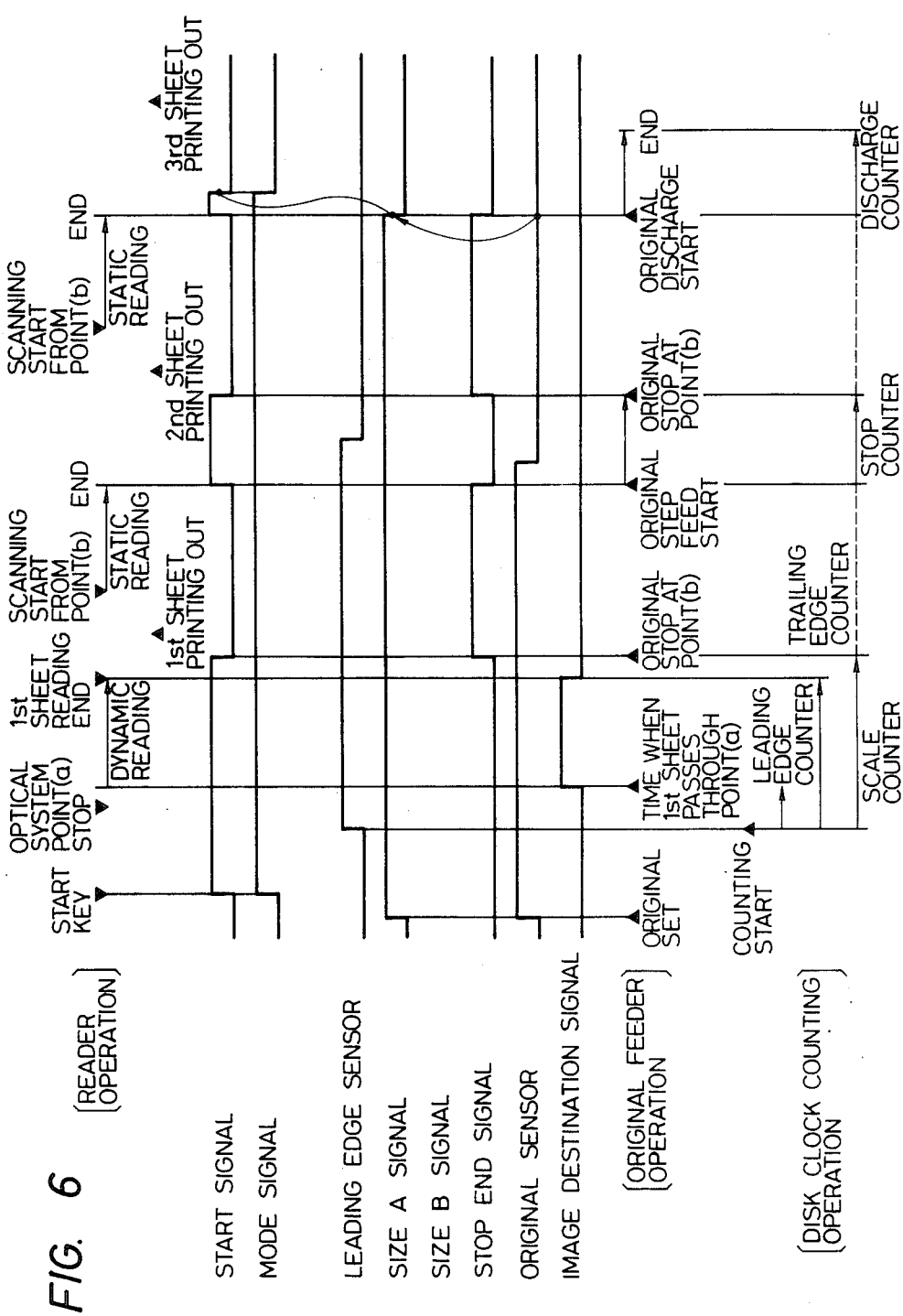
Figure 7:
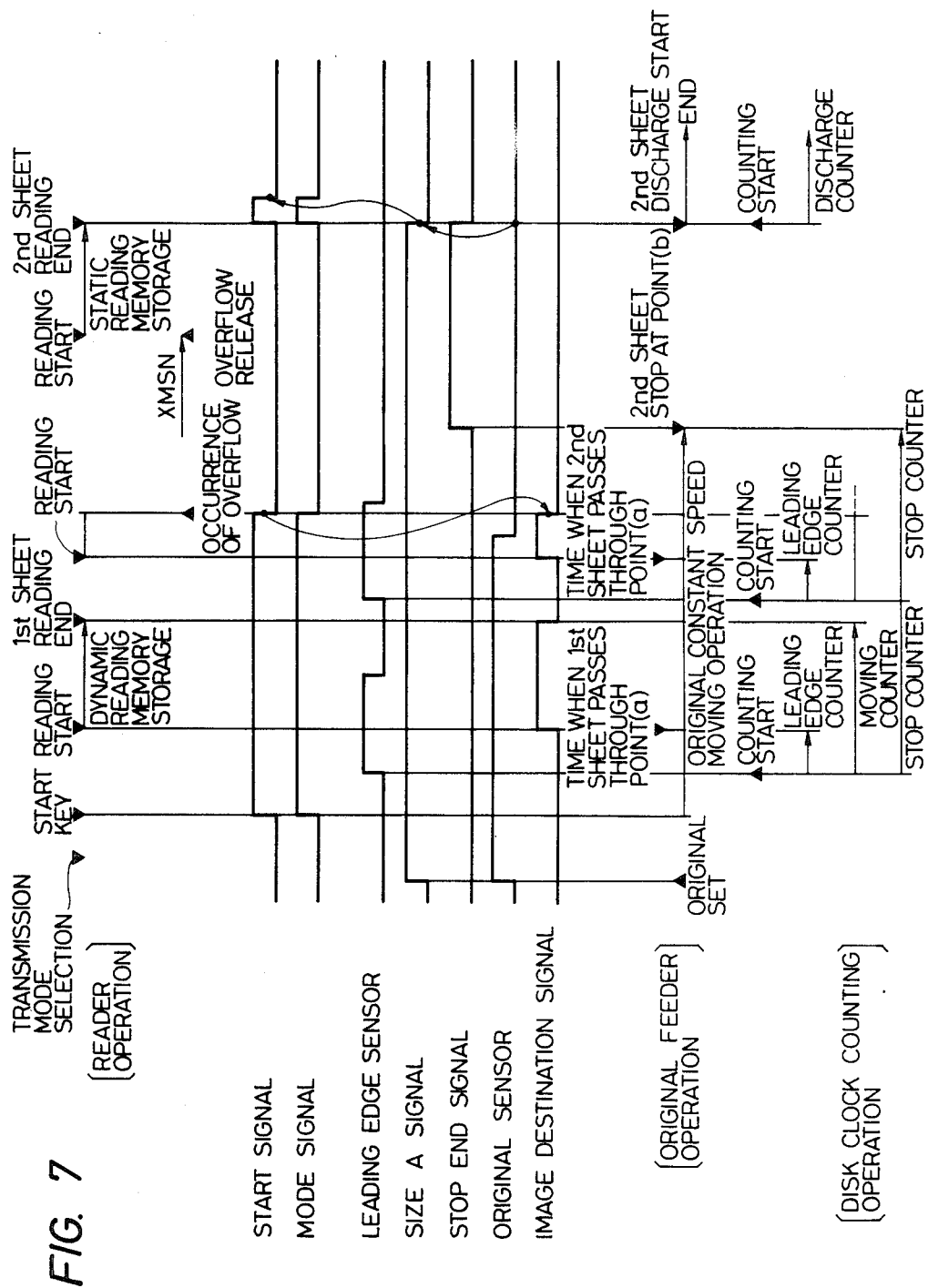

FIG. 3 is a timing chart in a copy mode when each of two A4 originals is subjected to single copy operation. FIG. 4 is a timing chart in a copy mode when each of two B4 originals is subjected to single copy operation. FIG. 5 is a timing chart in a copy mode when each of two A4 originals is subjected to multiple copy mode (two copies). FIG. 6 is a timing chart in a copy mode when an A4 original is subjected to single copy mode. FIG. 7 is a timing chart in a transmission mode when each of two A4 originals is subjected to single copy operation. FIGS. 8 to 13 are flow charts of programs stored in the one-chip microcomputer 35 in the original feed control circuit 62 and the one-chip microcomputer 55 in the control unit 56 in the reader B. The timing charts in FIGS. 3 to 7 are followed by the above programs.

Figure 8:
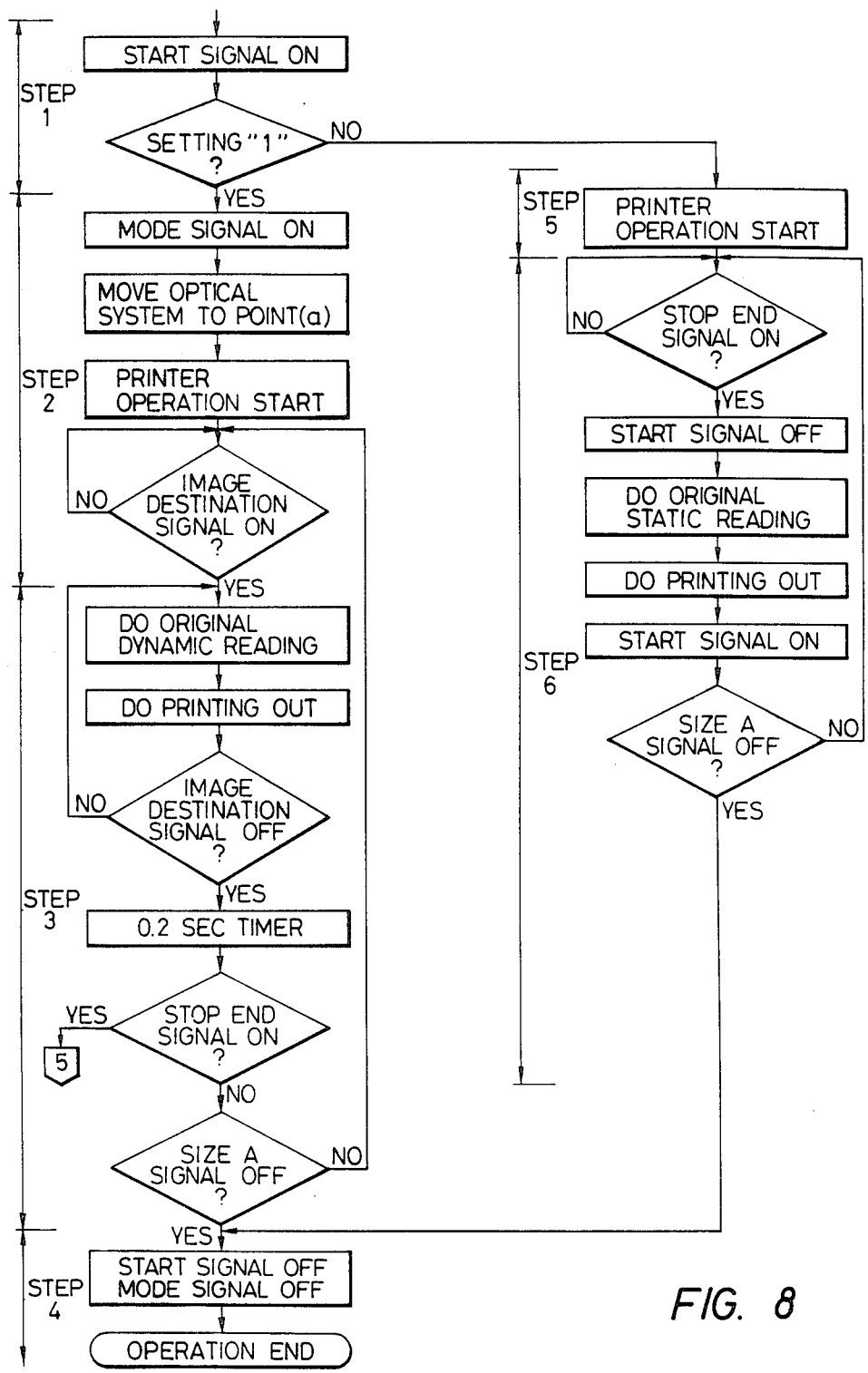
FIGS. 8, 11 and 12 are respectively flow charts for explaining the control operation of a reader.

The present invention will be described in detail with reference to FIGS. 8 to 13. FIG. 8 is a flow chart for explaining the operation of the timing charts in FIGS. 3 and 5 under the control of the microcomputer 55. In STEP 1, the start signal is enabled, and the microcomputer 55 checks whether or not the preset copy number or setting is 1. If YES in STEP 1, the flow advances to STEP 2. However, if NO in STEP 1, i.e., when the preset copy number is two or more, the flow jumps to STEP 5. In STEP 2, the MODE signal is enabled (high level) to perform dynamic reading for the original feed unit A, and the optical system is moved to the position a. The printer is then started, and the flow advances to STEP 3 when the leading edge signal is enabled. In STEP 3, dynamic reading is performed, and at the same time an instruction signal is supplied to the printer through the signal line 68 (FIGS. 1 and 2), thereby starting the printout operation. This operation continues until the leading edge signal is disabled. The microcomputer 55 checks through a 0.2-second timer whether the stop end signal is enabled. The timer time (0.2 second) is preset to be slightly longer than a time during which the trailing edge of the original passes by the position a and stops at the position b. When the stop end signal is enabled, the flow advances to the flow in FIG. 11. However, when the stop end signal is disabled, the microcomputer 55 checks whether or not the size A signal is disabled. When the size A signal is enabled, the flow returns to a middle of STEP 2, and dynamic reading and printout operation are performed. However, when the size A signal is disabled, the flow advances to STEP 4. The start signal and the MODE signal are disabled in STEP 4, and the operation is ended.

When setting of the preset copy number is 2 or more, an instruction is supplied to the printer to perform printing out, and the flow advances to STEP 6. In STEP 6, the start signal is disabled when the original is stopped at the position b and the stop end signal is enabled, thereby starting static reading. At the same time, printout is performed, and the start signal is enabled. The microprocessor 55 checks whether or not the size A signal is disabled. If the size A signal is not disabled, the flow returns to the beginning of STEP 6, and the above operation is repeated. However, when the size A signal is disabled, the flow advances to STEP 4.

Figures 1, 9:
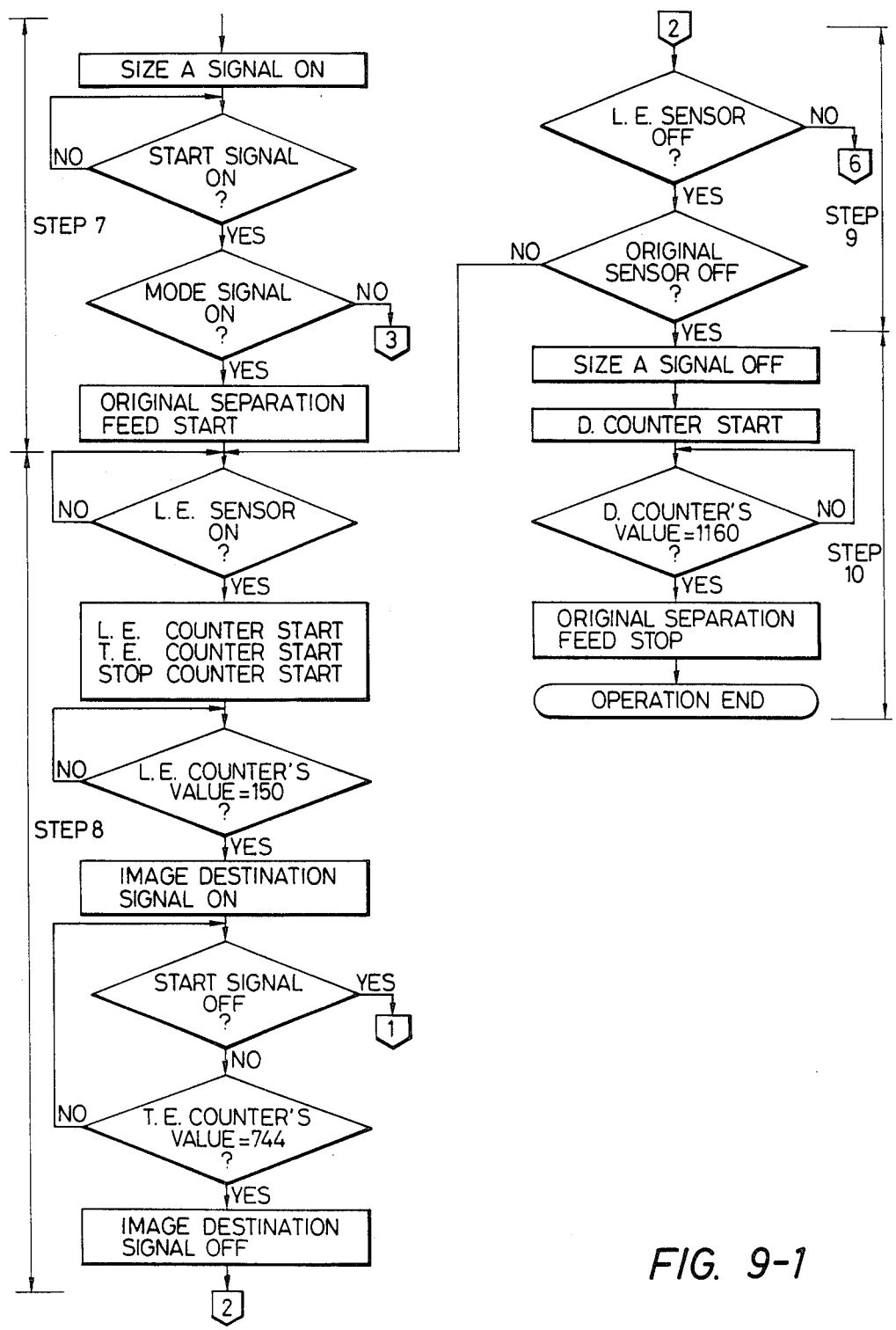
Figures 2B, 9:
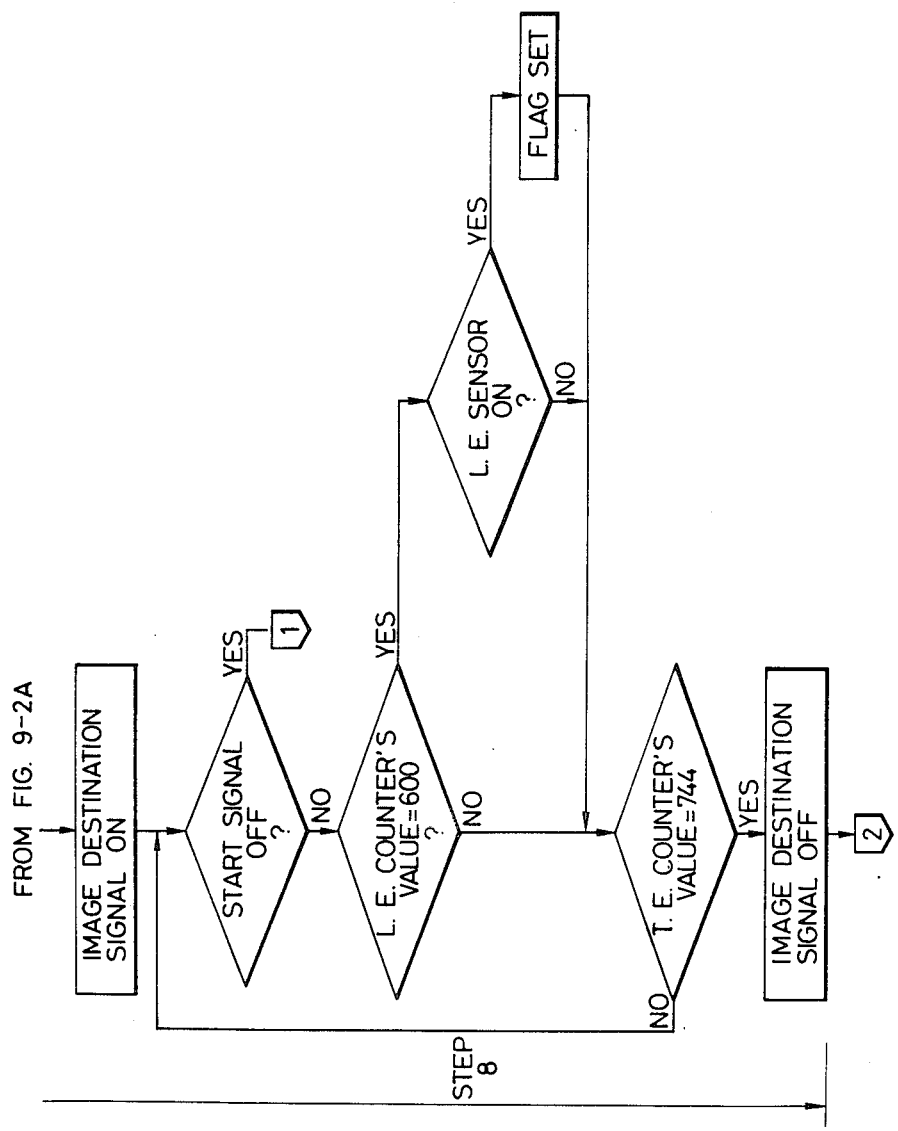

FIG. 9-1 is a flow chart for explaining the timing chart of FIG. 3 under the control of the microcomputer 35. The original is set on the hopper, and the flow advances to STEP 7. The next operation is started after the size A signal and the start signal are enabled. The microcomputer 35 checks whether or not the MODE signal is enabled, i.e., whether the original is fed for dynamic reading or static reading. When the MODE signal is disabled, the flow advances to that of FIG. 10-1. However, when the MODE signal is enabled, the original feed is started for dynamic reading, and the flow advances to STEP 8. In STEP 8, when the leading edge sensor 18 is started, i.e., when the leading edge of the original reaches the distal edge sensor 18, a leading edge counter, a trailing edge counter and a stop counter in predetermined areas of a RAM in the microcomputer 35 are started. These counters count clock pulses from the disk clock sensor which are generated in units of 0.5-mm displacements of the belt 20 (FIG. 1). The microprocessor 35 checks whether or not the value of the leading edge counter is 150. In this embodiment, the original dynamic reading position a is located 75 mm ahead of the leading edge sensor 18 (FIG. 1). When the value of the leading edge counter becomes 150, the leading edge signal is enabled. The microcomputer 35 then waits until the value of the trailing edge counter becomes 744 (297×2+150 where 297 mm is the length of an A4 sheet). During this period, the microprocessor 35 monitors every count whether or not the start signal is disabled. When the start signal is disabled, the flow advances to that of FIG. 13. When the value of the trailing edge counter becomes 744, the leading edge signal is disabled, and the flow advances to STEP 9. The microcomputer 35 checks in STEP 9 whether or not the leading edge sensor 18 is turned on. When the microcomputer detects that the leading edge sensor 18 is turned on, i.e., that the long size original is used, the flow advances to STEP 12 of FIG. 10-1. However, when the microcomputer detects that the leading edge sensor 18 is turned off, the microprocessor 35 checks whether or not the original sensor 30 is turned on. If the original sensor 30 is determined to be ON, the originals are left on the tray or hopper 1 (FIG. 1), so that the flow returns to STEP 8 to repeat the above operation. When an output from the original sensor 30 is set at low level, the flow advances to STEP 10 as an original discharge flow. The size A signal is disabled in STEP 10, and the discharge counter is started. The original feed is stopped until the value of the discharge counter reaches 1,160 (430×2 as a distance between the positions a and b+150×2 as a distance from the position b to the discharge port).

Figures 1, 10:
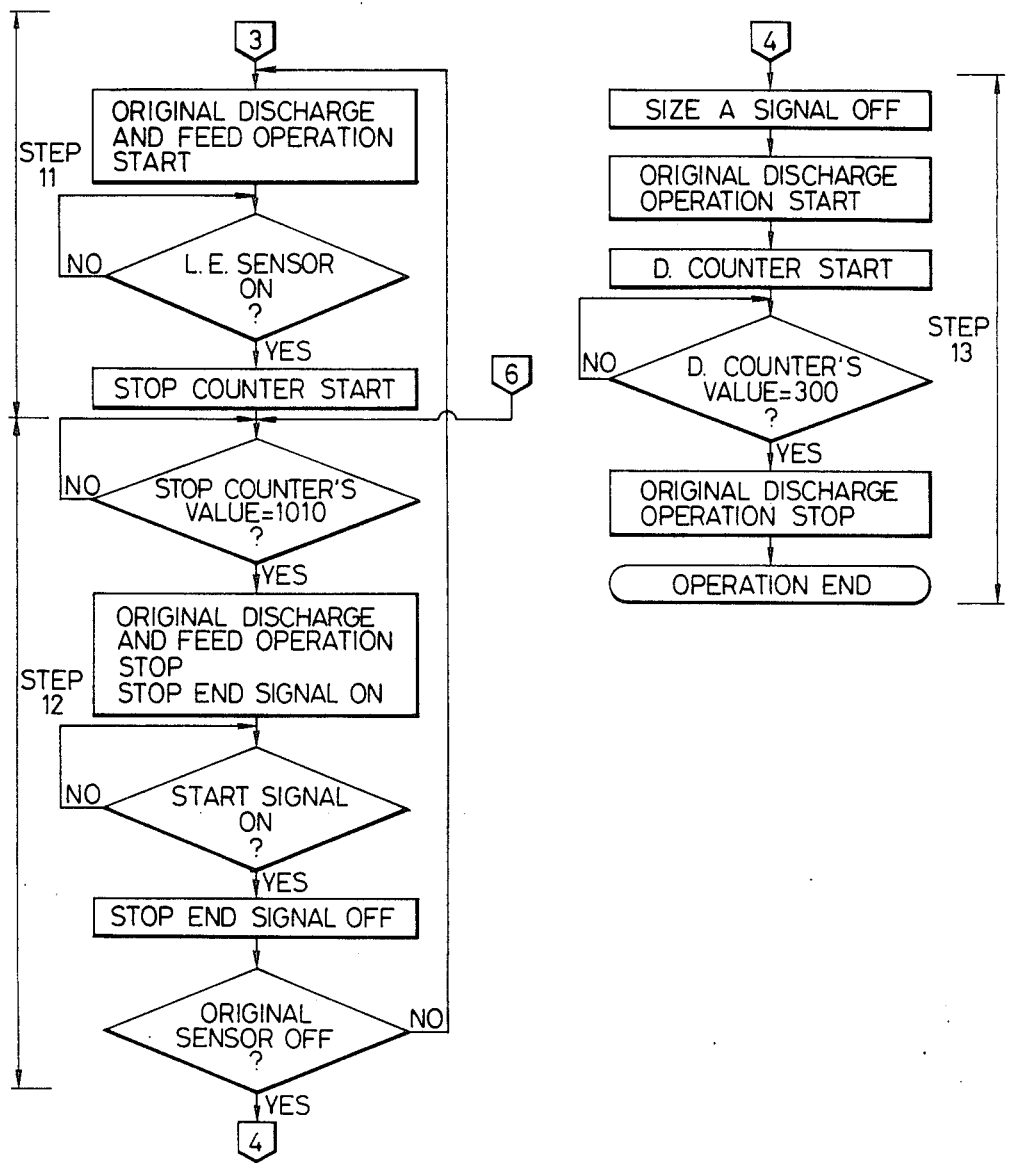
Figures 2, 10:
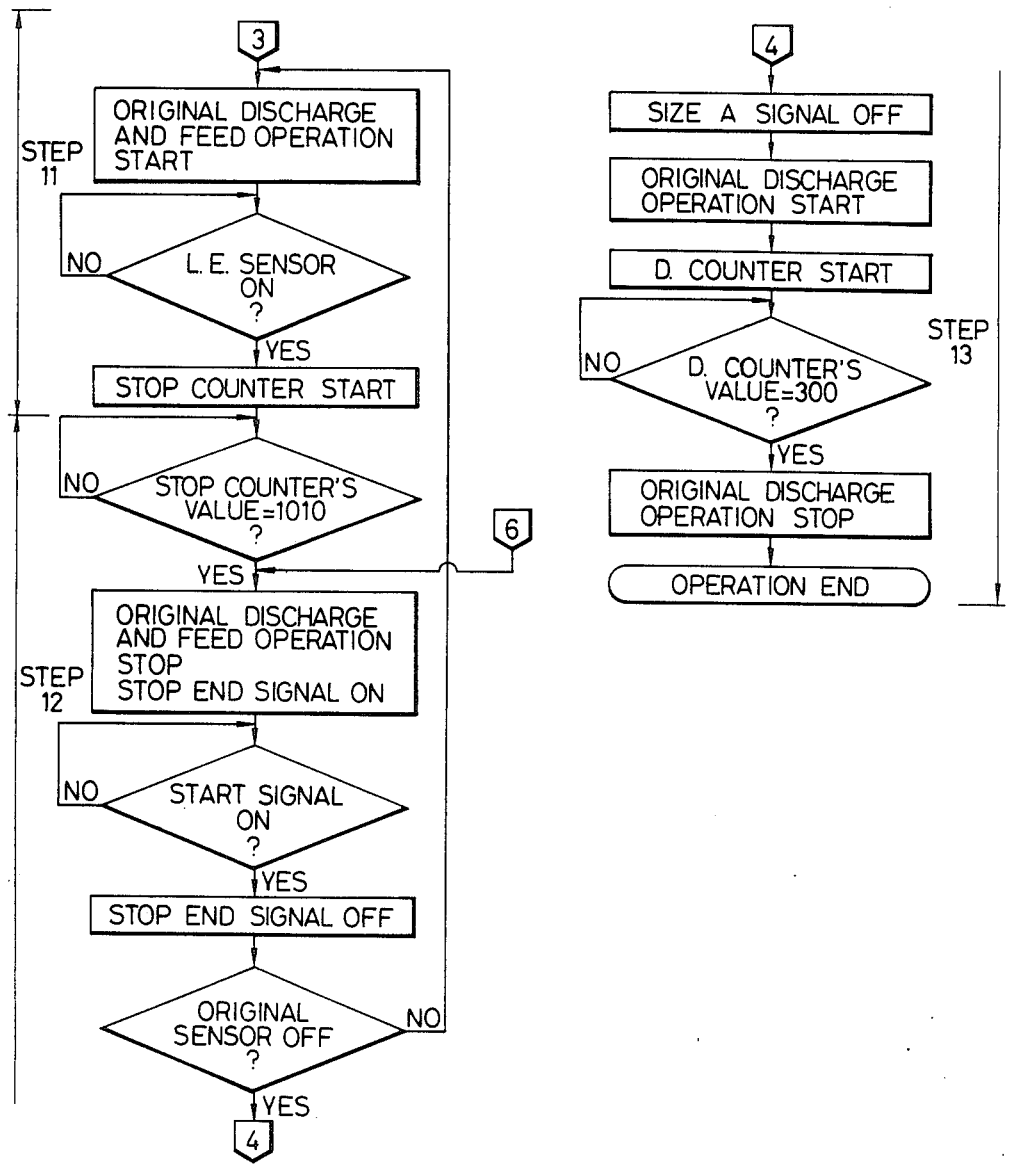

FIG. 10-1 is a flow chart for explaining the operation of the timing chart of FIG. 5 under the control of the microcomputer 35. The microcomputer 35 determines in STEP 7 (FIG. 9-1) that static reading is performed. The flow advances to STEP 11, and the original feed/discharge is started. The microcomputer 35 causes the stop counter to start when the leading edge sensor 18 is turned on. The flow advances to STEP 12. In STEP 12, the original is stopped at the position b when the value of the stop counter becomes 1,010 (430×2+75×2 where 75×2 is a distance between the leading edge sensor and the position a). The stop end signal is enabled. When static reading of the original is completed, the start signal is enabled while the stop end signal is disabled. The microcomputer 35 checks whether or not the original sensor 30 is turned on. When the microcomputer 35 detects that the original sensor 30 is turned on, the microcomputer 35 discriminates that the originals are still left in the hopper or tray 1 (FIG. 1), and the flow returns to STEP 11. The original replacement is performed in STEPs 11 and 12. However, when the microcomputer 35 detects that the original sensor 30 is turned off, the flow advances to STEP 13. The size A signal is disabled, and original discharge operation is started. At the same time, the discharge counter is started. The original discharge operation is stopped when the value of the discharge counter becomes 300 (150×2 as a distance from the position b to the discharge port).

The copy operation of the microcomputer 35 which is illustrated in the timing chart of FIG. 6 will be described with reference to the flow charts in FIGS. 9-2 and 10-2.

In this case, a position of the leading edge of the nonscanned portion of the original during dynamic reading corresponds to the position b, and image data is read from the position b. In this manner, an overlap portion of 5 mm is also read in static reading.

This operation will be described with reference to FIGS. 9-2, 10-2 and 6. When the leading edge sensor 18 detects the leading edge of the original in STEP 8' after STEP 7 is performed in the same manner as in FIG. 9-1, the leading edge counter, the trailing edge counter, the stop counter, and the long size counter in the predetermined areas of the RAM in the microcomputer 35 are started to count the clock pulses. When the value of the leading edge counter becomes 150, the leading edge signal is enabled. The microcomputer 35 checks whether or not the leading edge sensor is turned on when the value of the leading edge counter becomes 600 (297×2+3×2 where 297 mm is the length of the A4 sheet) while the value of the trailing edge counter 744 becomes 744. When the microcomputer 35 detects that the leading edge counter is started, i.e., that the long size sheet is used, a flag in a predetermined area of the RAM of the microcomputer 35 is set. When the value of the trailing edge counter becomes 744, the leading edge signal is turned off, and the flow advances to STEP 9'. In STEP 9', the microcomputer 35 checks whether or not the flag is set. When the microcomputer 35 detects that the flag is set, i.e., when the long size sheet is used, the flag is reset. The flow advances to a middle of STEP 12' of FIG. 10-2 until the value of the long size counter becomes 1594 (297×2+100−5×2 where 297 mm is the length of the A4 sheet and 1010 is the value of the stop counter). However, if the flag is reset, the same operation as in STEP 10 in FIG. 9-1 is performed.

In this case, the optical system in the reader is scanned by a distance corresponding to the A4 size sheet from the position b in static reading of STEP 11 (FIG. 11), and the image information is read by the CCD.

Figure 11:
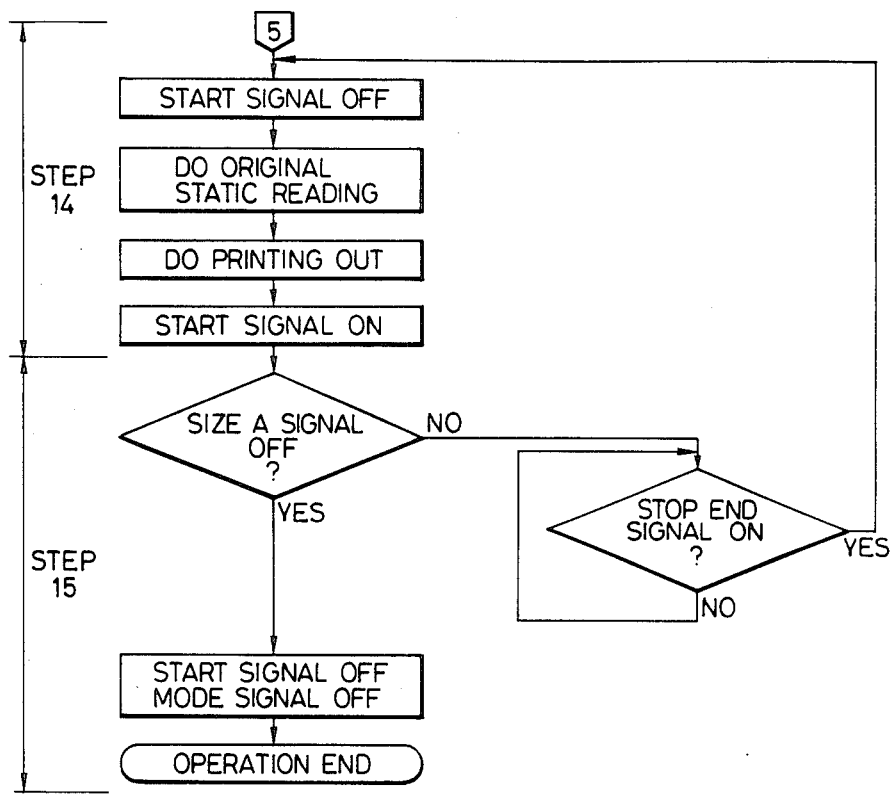

FIG. 11 is a flow chart for explaining the operation of the timing chart of FIG. 6 under the control of the microcomputer 55 when the A4 long size original is used. STEPs 1 and 2 in FIG. 8 are executed. When the stop end signal is enabled in STEP 3, the flow advances to STEP 14 in FIG. 11. In STEP 14, the start signal is disabled, static reading is performed, and image data is printed out. At the same time, the start signal is enabled, and the flow advances to STEP 15. The microcomputer 55 checks in STEP 15 whether or not the size A signal is enabled. If the microcomputer 55 detects that the size A signal is enabled, the long size sheet still continues and the flow returns to STEP 14 when the stop end signal is enabled. However, if the microcomputer 55 detects that the size A signal is disabled, the start signal and the MODE signal are disabled, and the operation is ended.

Figure 12:
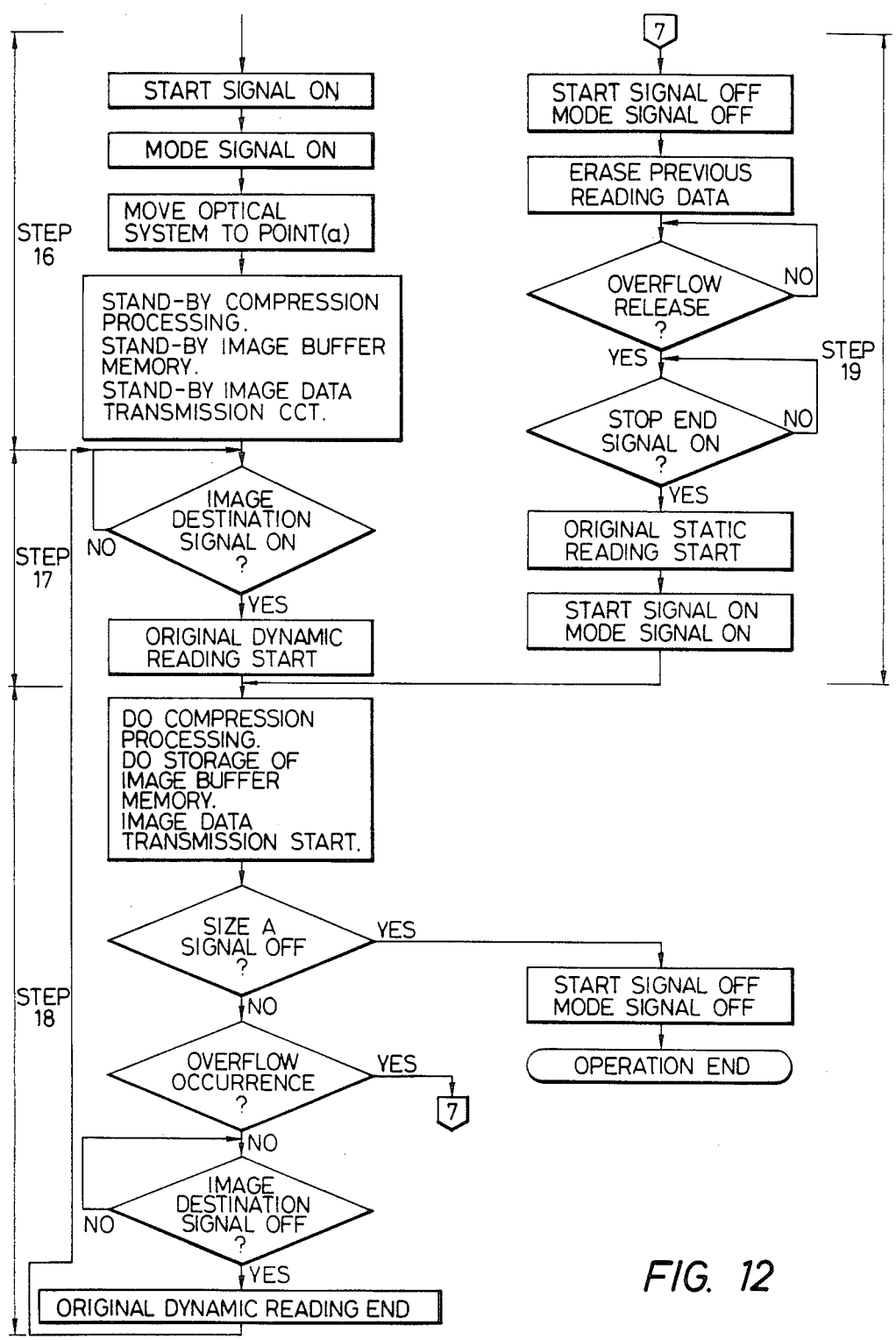

FIG. 12 is a flow chart for explaining the flow chart of FIG. 7 under the control of the microcomputer 55. In STEP 16, the start signal and the MODE signal are enabled to move the optical system to the position a. The compression processing circuit 47 (FIG. 1) the image buffer memory 48 and the image data transmitter 50 are started and set in the standby mode, and the flow advances to STEP 17. In STEP 17, dynamic reading is started when the leading edge signal is enabled, and the flow advances to STEP 18. In STEP 18, the microcomputer 55 performs compression processing, storage of data in the image buffer memory, and image data transmission. At the same time, the microcomputer 55 checks whether or not the size A signal is disabled, i.e., whether or not the original transmission is ended. When the microcomputer 55 checks that the size A signal is disabled, the start signal and the MODE signal are disabled, and the operation is ended. However, when the microcomputer 55 detects that the size A signal is enabled, the microcomputer 55 detects the occurrence of an overflow through the signal line 72 (FIG. 2), and the flow advances to STEP 19. However, when the overflow does not occur, the dynamic reading is ended when the leading edge signal is disabled, thereby returning to STEP 17. In STEP 19, the start signal and the MODE signal are disabled, and the image data read prior to the occurrence of overflow is deleted. The overflow is then cancelled. In other words, the microcomputer 55 checks the signal line 72 (FIG. 2) until an empty area for one page is formed in the buffer memory area. When the overflow is cancelled, the microcomputer 55 waits to perform static reading until the stop end signal representing that the original is stopped at the position b is disabled. Static reading is then started, the start signal and the MODE signal are disabled, and the flow advances to STEP 18.

Figure 13:
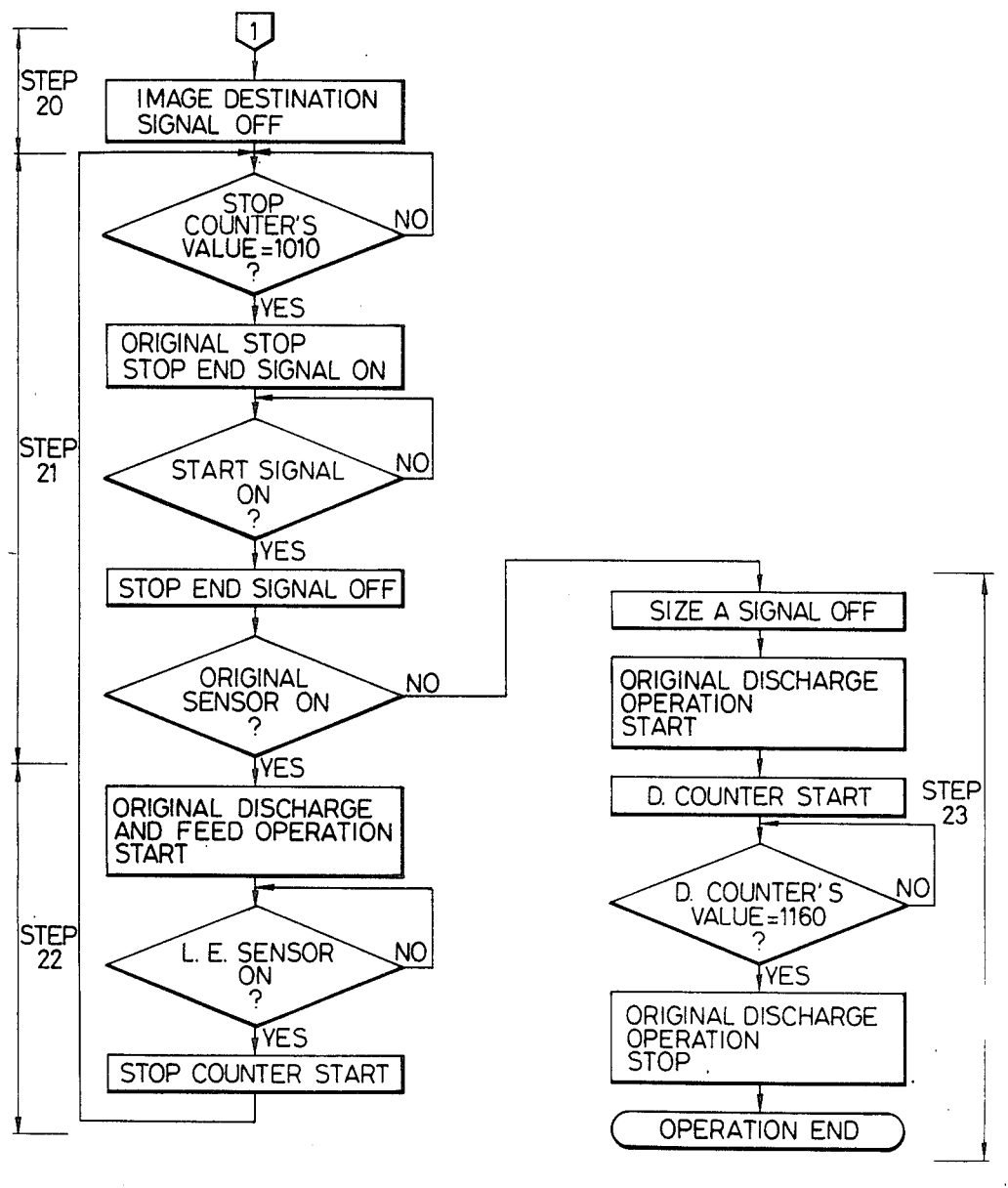

FIG. 13 is a flow chart for explaining the operation of the timing chart of FIG. 7 under the control of the microcomputer 35. First, the operation continues from STEP 7 to an intermediate operation of STEP 8 of FIG. 9-1. The microcomputer 35 detects the overflow when the start signal is disabled. The flow jumps to STEP 20. In STEP 20, the leading edge signal is disabled, and the flow advances to STEP 21. In STEP 21, the microcomputer 35 causes the original to stop when the value of the stop counter started in STEP 8 becomes 1010. The stop end signal is enabled. The stop end signal is then disabled while the start signal is enabled. The microcomputer 35 checks whether or not the original sensor 30 is turned on, i.e., whether or not the original is left on the tray or hopper 1. When the microcomputer 35 detects that the original is not left on the hopper 1, the flow advances to STEP 23. However, when the microcomputer 35 detects that the original is left on the hopper 1, the flow advances to STEP 22. In STEP 22, the original discharge/feed is started. The microcomputer 35 causes the stop counter to start when the leading edge sensor 18 is turned on, and the flow returns to STEP 21 wherein the above operation is repeated. In STEP 23, the size A signal is disabled, the original is discharged, and the discharge counter is started. When the value of the discharge counter becomes 1160, the original discharge operation is stopped, and the entire operation is ended.

The control operation of the B4 size original which is shown in the timing chart of FIG. 4 can be performed by changing the size signal from the size A signal to the size B signal and changing a preset count value of the trailing edge counter in accordance with the flow charts of the microcomputers 35 and 55.

According to the embodiment described above, when an original is detected at the original setting position under the conditions that the preset copy number or setting is one and dynamic reading is performed, or otherwise, i.e., when the preset copy number or setting is 2 or more or the original is not detected at the original setting position, static reading can be performed, thereby preventing inconvenience (e.g., only one copy is obtained when dynamic reading is performed in a multicopy mode, and a copy speed is decreased due to original replacement time when static reading of a plurality of originals is performed).

In addition, dynamic reading can be switched to static reading when the overflow of the image buffer memory occurs while the original image data are sequentially stored in the image buffer memory in dynamic reading, thereby omitting cumbersome operation for returning the original. Damage to the original due to its returning can be prevented, and a time loss accompanying the returning of the original can be eliminated. In addition, the operability of the apparatus can be improved.

Furthermore, when a long size sheet is read, dynamic reading can be switched to static reading at the time when the length corresponding to the standard length portion of the long size sheet is scanned, so that a remaining portion of the long size sheet can be read by staic reading. At the reception side, image data is printed out on separate sheets. In addition, even if single static reading cannot cover the entire image, i.e., even if computer form paper or a roll original is used, the image can be printed a plurality of times while edge image portions of each sheet overlap the edge image portions of the adjacent sheets. At the reception side, the image portions are printed out on a plurality of sheets. In this manner, a long size original can be transmitted without dividing it.

In the above embodiment, the stop position of the original is controlled to overlap the edge image portions of the adjacent sheets. However, the edge image portions can overlap by controlling the read timing of the CCD.

In the above embodiment, dynamic reading is switched to static reading when the image data buffer memory overflows. The switching operation is not limited to this case. For example, when a feed failure such as jam occurs while the apparatus is used in a local mode, i.e., while the apparatus is used as a normal copy machine in a copy mode without using the communicating image buffer memory, dynamic reading can be switched to static reading. After jamming is eliminated, static reading can be performed. In this case, the original return operation can be omitted.

The above embodiment is exemplified by using A4 and B4 size paper. However, the same control operation as in the embodiment can be performed for another size paper.

What is claimed is:

1. An image recording apparatus comprising:
   reading means operated in a first mode for reading image data while an original is being moved and a second mode for reading the image data while the original is stopped at a predetermined position;
   recording means for recording an image on a recording medium in accordance with the image data read by said reading means; and
   selecting means for selecting one of the first and second modes in accordance with preset recording sheet number data.

2. An apparatus according to claim 1, wherein said selecting means selects the first mode when the preset recording sheet number data represents a single sheet and the second mode when the preset recording sheet number data represents not less than two sheets.

3. An apparatus according to claim 1, wherein said reading means comprises original feeding means for feeding the original and scanning means which reciprocates to scan the original in the predetermined position.

4. An apparatus according to claim 3, wherein said scanning means is fixed at a dynamic reading position in the first mode so as to cause said feeding means to feed the original to pass by said scanning means.

5. An apparatus according to claim 3, wherein said scanning means passes by the original stopped in the predetermined position in the second mode.

6. An apparatus according to claim 4, wherein said feeding means feeds the original in a static reading position to read the image data from the original by reciprocating said scanning means in the second mode, the dynamic reading position in the first mode and the static reading position in the second mode being located on a single platen of said recording means.

7. An apparatus according to claim 3, wherein said scanning means comprises image pick-up means for converting an optical signal to an electrical signal, the image data being read by said image pick-up means.

* * * * *